United States Patent [19]
Nilsen

[11] 4,354,090
[45] * Oct. 12, 1982

[54] Z-BAR GUIDE APPARATUS AND METHOD OF BUTT WELDING

[75] Inventor: Carl J. Nilsen, Hopatcong, N.J.

[73] Assignee: SWS Incorporated, Landing, N.J.

[ * ] Notice: The portion of the term of this patent subsequent to Jun. 9, 1998, has been disclaimed.

[21] Appl. No.: 233,251

[22] Filed: Feb. 10, 1981

Related U.S. Application Data

[63] Continuation-in-part of Ser. No. 88,197, Oct. 23, 1979, Pat. No. 4,272,004.

[51] Int. Cl.³ .............................................. B23K 27/00
[52] U.S. Cl. .............................. 219/121 LC; 219/64; 219/121 LD; 228/17.5
[58] Field of Search ................ 219/121 LC, 121 LD, 219/121 LY, 121 EC, 121 ED, 121 EX, 61, 64, 84; 228/17, 17.5

[56] References Cited

U.S. PATENT DOCUMENTS

| | | | |
|---|---|---|---|
| 2,307,085 | 1/1943 | Winters | 219/64 |
| 2,883,956 | 4/1959 | Nordquist | 113/8 |
| 3,285,490 | 11/1966 | Roper | 113/8 X |
| 3,834,010 | 9/1974 | Wolfe et al. | 29/477.7 |
| 3,889,617 | 6/1975 | Lorenzen et al. | 113/116 |
| 4,145,986 | 3/1979 | Bauer | 113/7 R |
| 4,160,892 | 7/1981 | Opprecht et al. | 219/83 |
| 4,315,132 | 2/1982 | Saurin et al. | 219/121 LD |

FOREIGN PATENT DOCUMENTS

2426379 5/1974 Fed. Rep. of Germany .
2006659 5/1979 United Kingdom .

*Primary Examiner*—C. L. Albritton
*Attorney, Agent, or Firm*—Dowell & Dowell

[57] ABSTRACT

A method and apparatus for guiding the opposed edges of sheet metal into substantially abutting edge-to-edge relationship with one another and thereafter welding said edges by a high energy welding source to form a seam. The invention enables the continuous high speed butt welding of the sheet metal to form cylindrical bodies. The apparatus includes three elements which are cooperatively secured in assembled relationship and thereby form opposed and converging guide channels which converge into open relationship with one another along the length of the apparatus so that the opposing edges of sheet metal are guided into intimate abutting edge-to-edge relationship with one another. The elements extend to a point adjacent the weld zone in order to maintain the sheet metal edges in abutting relationship as they enter the weld zone.

In another embodiment, two of the elements may include portions which extend into and beyond the weld zone. Such portions are provided with a tapered opening through which the high energy welding source may be continuously focused relative to the point of the weld.

25 Claims, 10 Drawing Figures

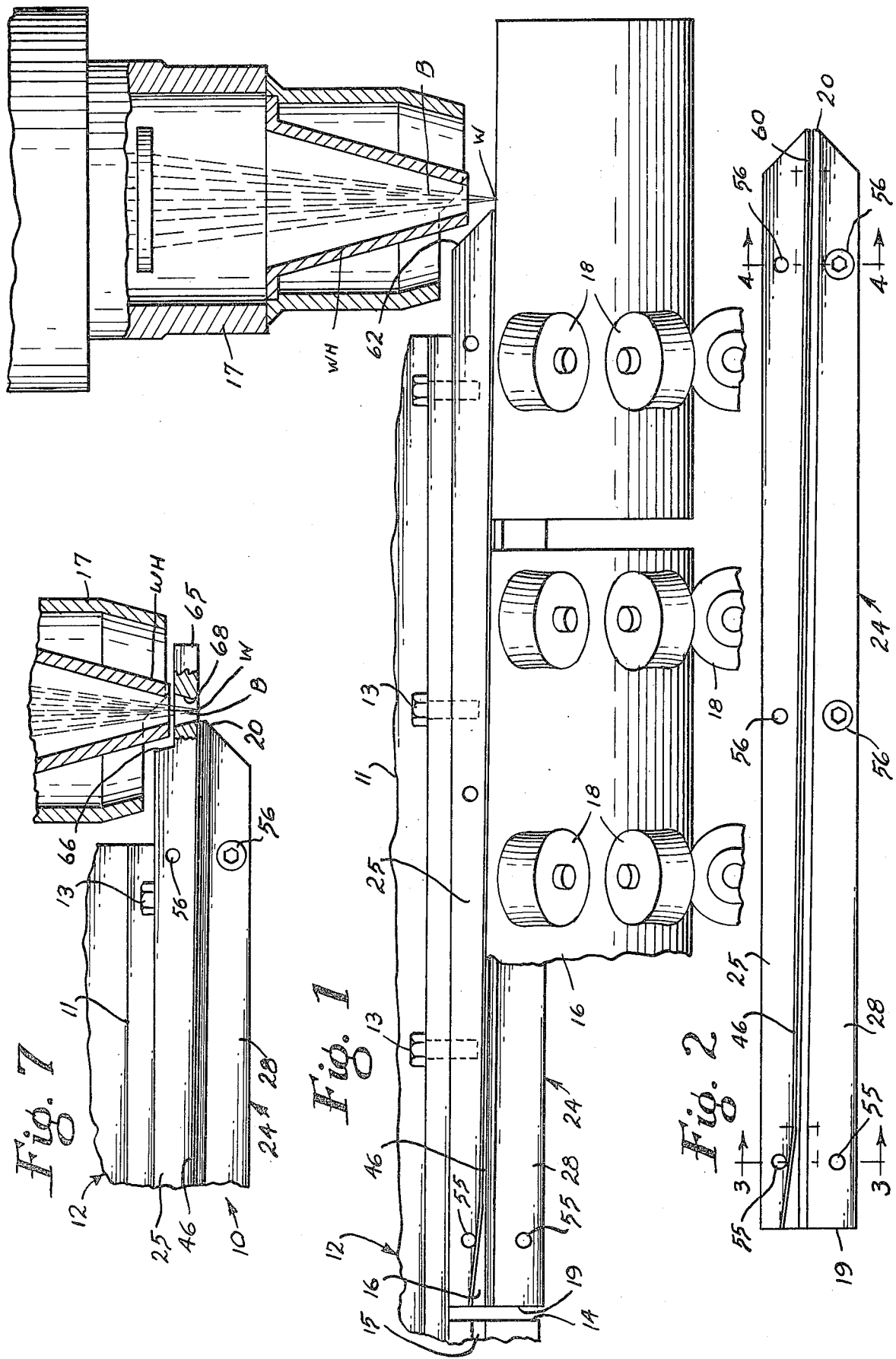

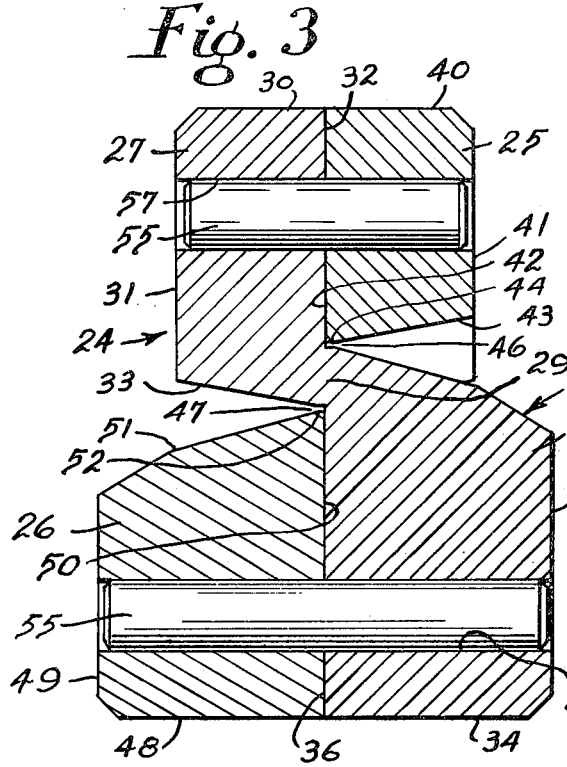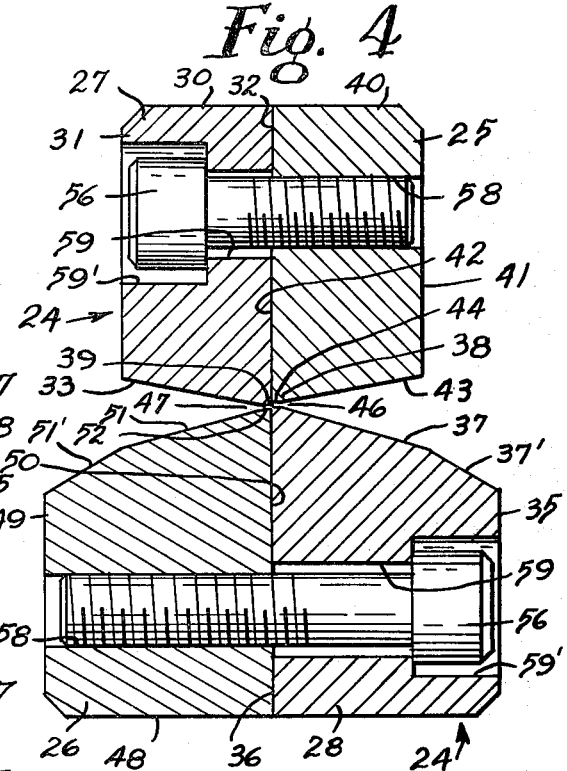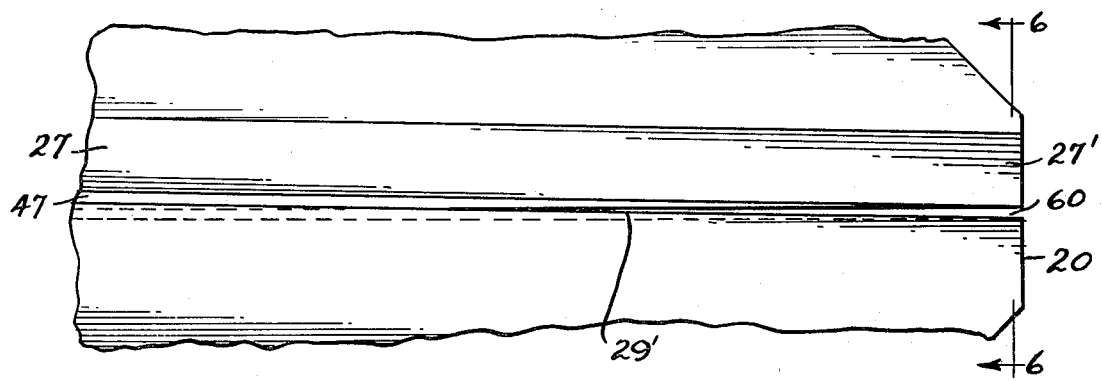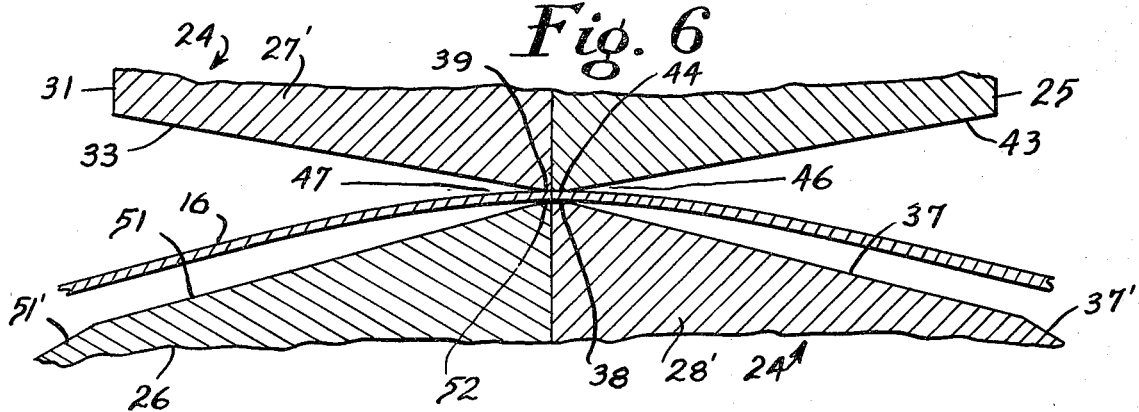

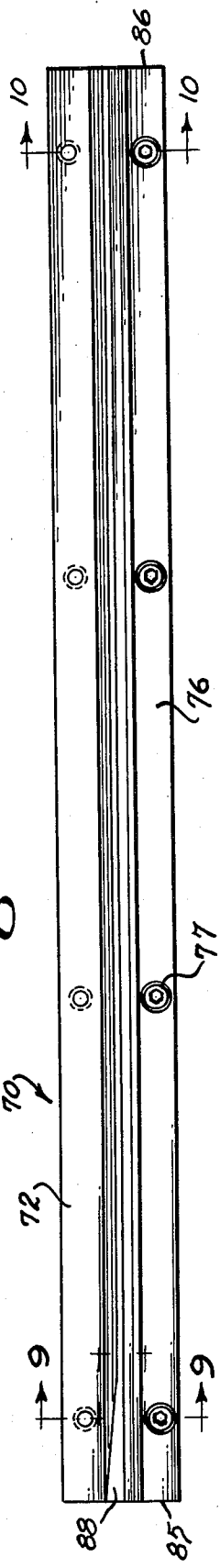
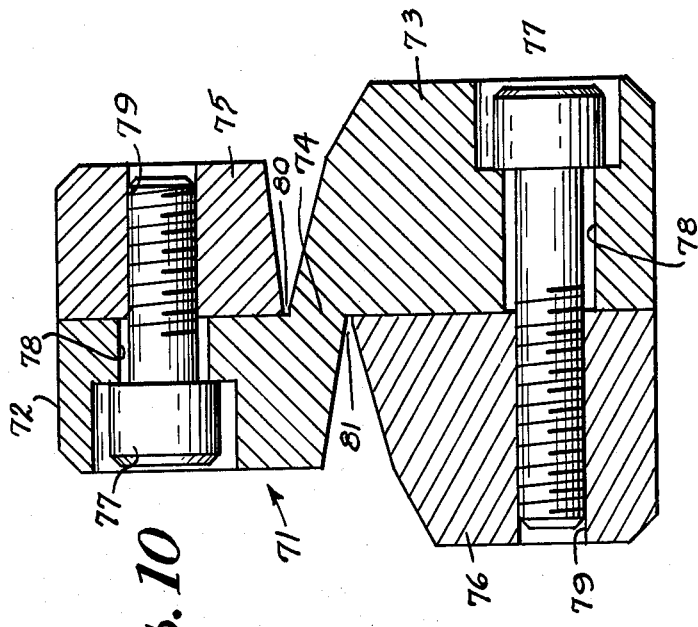
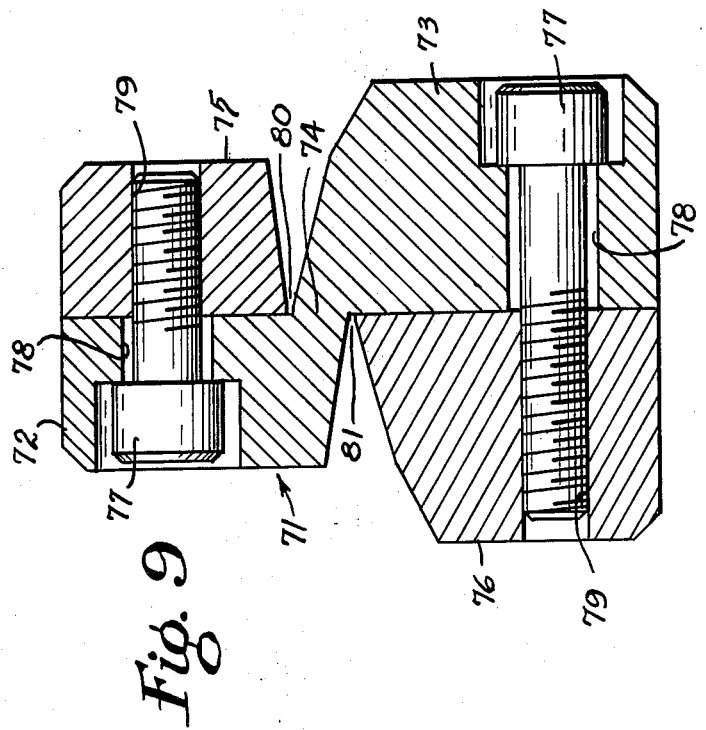

Z-BAR GUIDE APPARATUS AND METHOD OF BUTT WELDING

CROSS-REFERENCES TO RELATED INVENTIONS

This application is a continuation-in-part application of applicant's pending U.S. application, Ser. No. 88,197 filed Oct. 23, 1979 entitled Z-Bar Guide Apparatus, Pat. No. 4,272,004.

TECHNICAL FIELD

This invention relates generally to methods and apparatus for maintaining the edges of sheet metal in intimate engagement with one another and particularly to a method for continuously butt welding cylindrical objects at high speeds using high energy sources wherein a three piece Z-Bar is utilized to guide the opposing edges of the sheet material into abutting edge-to-edge relationship within the Z-Bar. The three pieces of the Z-Bar define two vertically converging guide channels which openly converge in horizontal alignment with each other along the length of the Z-Bar so that the sheet material guided therein will be maintained in abutting relationship as the material enters the weld zone adjacent the tip or forward end of the Z-Bar.

BACKGROUND ART

As described in applicant's prior application, Ser. No. 88,197, it has been well known in the welding industry in general and the can or container welding industry in particular that it is difficult to butt weld the sheared or slit edges of tinplate or other sheet metal in a substantially continous welding operation. In applicant's prior application, however, a three-piece Z-Bar apparatus was described which could be used for continously lap welding sheet material and also disclosed a method for permitting the opposed edges of the overlapped sheet material to be diverged relative to one another as they entered a high energy welding zone whereby the material would be essentially in edge-to-edge relationship at the point of the weld so that a butt welded seam could be created. Obtaining continuously satisfactory results in creating acceptable butt welded seams by controlled diverging of the opposed sheet metal edges is somewhat difficult, however.

Other prior art developments have been made in the high energy welding of sheet metal and particularly sheet metal containers. In U.S. Pat. No. 4,152,573 to Saurin et al, a device and method for manufacturing cans using laser welding is disclosed. As discussed in that patent, it would be advantageous to form containers using butt welded seams rather than overlapped seams, particularly due to the problems encountered with forming the container top and bottom due to the increased material thickness along the line of the weld. In Saurin et al, a technique of butt welding is disclosed wherein the opposed edges of the sheet metal are held together in edge-to-edge relationship by special clamping members or vises. In such a method and in using such an apparatus, the high energy welding procedures must be interrupted after each container is welded so that another sheet of material can be wound and clampingly engaged between the vise-like members. Thus, such a process although providing a desired butt welded product, does so only with significant increase in time and therefore expense.

Additionally, there are other problems associated with conventional type Z-Bar Guides used in the welding industry. Not only do such problems include time and cost concerning machinery, repair or replacement, but such conventional structures have not been specifically adapted or designed to provide for the continuous butt welding of sheet metal stock to form such cylindrical products as cans, containers and the like. Some other examples of prior art disclosures include U.S. Pat. Nos. 2,883,956; 3,834,010 and 4,145,986 and Federal Republic of Germany Offenlegungsschrift 24 26 379 (Feb. 1, 1975).

SUMMARY OF THE INVENTION

This invention is embodied in a three-piece Z-Bar which guides the edges of sheet metal or other sheet material into intimate abutting edge-to-edge engagement with each other prior to introducing the sheet material into a high energy welding apparatus such as a laser, electron beam or other welding machine, particularly of the type which may be used in the shaping and welding of cans, tubes and the like. The Z-Bar includes a central portion having vertically offset upper and lower portions connected by a web or interface which is progressively reduced in thickness along its length until it terminates leaving the offset portions to extend beyond in spaced and non-connected relationship. Therefore, the amount of interface is reduced until there is no connection between the offset portions of the central guide member at an area adjacent the discharge end of the apparatus. Upper and lower guide bars are removably connected in fixed position to the central portion and generally extend substantially coextensive therewith. Opposed channels having sharp corners and a narrow width are created between the upper and lower guide bars and the central guide member. The opposed channels converge or taper vertically from the feed or forward end of the Z-Bar to an area spaced from the discharge end thereof to provide separate guide slots which converge to a point of open communication to form a single guide path which extends to the discharge end of the Z-Bar.

It is a primary object of this invention to provide a Z-Bar or guide apparatus for continuous welding sheet metal cans and tubes at speeds of at least 15 to 80 meters a minute using high energy laser, electron beam or plasma arc welding, with greater speeds being contemplated.

It is a further object of this invention to provide a Z-Bar for use in butt welding sheet material in which the guide grooves of the Z-Bar are vertically converged to a vertically aligned open communication with one another inwardly of the discharge end of the Z-Bar so as to permit the edges of the sheet material to converge into edge-to-edge intimate engagement with each other at a point inwardly of the Z-Bar and remote from the discharge end thereof whereby such relationship of the opposed edges will be maintained at the welding head.

It is another object of this invention to provide a Z-Bar apparatus for use in seam welding sheet material in which the surfaces that are subject to the most wear are formed of a wear-resistant material such as tool steel, or a carbide such as silicon carbide, tungsten carbide, or the like, while parts subject to less wear may be made from other less expensive material.

It is a further object of this invention to provide a Z-Bar which is particularly adapted for use in high energy welding of sheet material such as by laser, electron beam or plasma arc welding and which guides the edges of the sheet material in vertically converging channels to thereby guide such edges into substantially intimate engagement in edge-to-edge relationship with one another as they are discharged from the Z-Bar without the aid of vertically disposed supplemental pressing rollers or other supplemental guide members to vertically restrain the edges of the sheet metal together in abutting relationship.

It is a further object of this invention to provide a Z-Bar for high energy butt welding of cans or tubular bodies in a continuous sequence in which the guide bar apparatus converges the edges of the sheet material into abutting relationship so that such edges enter the welding zone in edge-to-edge contact.

It is another object of this invention to provide a three-piece Z-Bar for welding the edges of sheet material in which the three guide bars extend beyond the point at which the opposed channels converge and which maintain the edges of the sheet material in abutting edge-to-edge relationship with each other as they enter the welding station.

It is still another object of this invention to provide a Z-Bar in which the channels that guide the edges of the sheet material are provided with sharp corners along the guiding surfaces.

It is an alternative object of this invention to provide a Z-Bar for guiding the opposed edges of sheet metal into a high energy welding zone wherein portions of the Z-Bar extend beyond the welding zone whereby the Z-Bar may selectively be used as an electrical ground at the area of the weld.

BRIEF DESCRIPTION OF THE DRAWINGS

FIG. 1 is a side elevational view illustrating one application of the invention.

FIG. 2 is a side elevational view of the Z-Bar per se.

FIG. 3 is an enlarged sectional view taken on the line 3—3 of FIG. 2.

FIG. 4 is an enlarged sectional view taken on the line 4—4 of FIG. 2.

FIG. 5 is an enlarged fragmentary side elevational view of a portion of the Z-Bar illustrating the termination of the web portion remote from the discharge end thereof.

FIG. 6 is an enlarged sectional view taken along line 6—6 of FIG. 5.

FIG. 7 is a fragmentary side elvational view of another embodiment of the invention.

FIG. 8 is a side elevational view of another embodiment

FIGS. 9 and 10 are enlarged sectional views taken on the lines 9—9 and 10—10 respectively of FIG. 8.

DESCRIPTION OF THE PREFERRED EMBODIMENT

With continued reference to the drawings, the present invention includes a Z-Bar 10 which is mounted so as to be suspended from the frame 11 of a conventional can forming machine 12 using a plurality of bolts 13 or similar fastening means. Depending below the frame 11 is a portion of a feed bar 14 of the forming machine which feed bar normally is relatively narrow in cross-section and may include a relatively wide groove 15 on each side thereof for initially receiving and guiding the edges of one or more sheets of metal or other material 16 as it approaches the Z-Bar. It is contemplated that the feed bar 14 could constitute a Z-Bar having generally straight non-converging channels as well be described later. Although the Z-Bar of the present invention may be used to form a butt weld on any conventional sheet materials and may be used with any conventional high or low energy welding machines, it is shown in the preferred embodiment as it is used in conjunction with a can or tube froming machine having a high energy welder such as a laser welder 17. The Z-Bar 10 extends along the can forming and welding machine 12 and generally terminates adjacent the laser welder 17, as shown in FIG. 1. In practice, it has been found that the Z-Bar should be spaced within approximately 0.125 inch (3.175 mm) from the point of the weld.

In manufacturing cylindrical bodies such as cans or tubes, the sheet metal or other sheet material 16 passes through a conventional roll former to the feed bar 14 of the can forming machine and is urged into a cylindrical configuration by a plurality of spaced rollers 18. As shown in FIG. 1, there may be several sets of such rollers disposed along the length of the machine which cause a substantially flat sheet of material to be formed into a generally cylindrical configuration with the side edges being slidably received within the grooves 15 of the feed bar 14 of the forming machine. It should be noted that although the drawings depict a series of rollers for forming the sheet material, other conventional forming mechanisms, such as arcuately shaped forming rings or guide rods may be used.

In addition to the means for forming the sheet material, there also must be some means provided for advancing the sheet material along the grooves 15 of the forming machine 12, the Z-Bar 10 and through the welding station. In this regard, conventional chain type conveyors, drive rollers, reciprocating pistons or push rods or the like may be used depending upon the type of conventional welder involved. As it is believed that the type of advancing mechanism is not necessary to the understanding of the present invention, such advancing mechanism has not been shown in the drawings.

As was noted earlier, this invention is particularly useful for making butt welds with laser, electron beam or plasma arc welders. In this regard, the optics of the laser welder 17 are mounted on the frame adjacent the discharge end of the Z-Bar 10 and in a position such that the laser beam may be focused on the sheet material which has passed through the Z-Bar.

With particular reference to FIGS. 1-4, the Z-Bar 10 of the present invention includes a first or feed end 19 located adjacent the feed portion 14 of the forming machine 12 and extends to the discharge end 20 which is positioned in close proximity to the welder 17. The Z-Bar is constructed of three elongated components including a central guide member 24 and a pair of elongated upper and lower guide bars 25 and 26. The central guide member includes an upper portion 27 and a vertically offset lower portion 28 which are interconnected or are interfaced by means of a vertically planar web portion 29. The upper portion 27 of the central guide member 24 includes an upper wall 30, outer wall 31, inner wall 32 and lower wall 33. The lower portion of the central guide member 24 includes a lower wall 34, outer wall 35, inner wall 36 and upper wall 37.

The web portion 29 actually is the amount of interface material which connects the upper and lower portions of the central guide member and generally has no horizontal dimension. It should be noted that the innermost portions 38 and 39 of the upper surface 37 and the lower surface 33 of the lower and upper portions 28 and 27 respectively are substantially flat or horizontal.

Also, the lower wall 33 of the upper portion of the central guide member angles downwardly and inwardly from the outer wall 31 to the inner planar surface 39 thereof. On the other hand, the upper wall 37 of the lower portion of the central guide member angles upwardly and inwardly from the outer wall 35 to the inner surface 38 thereof. With respect to the upper wall 37 of the lower portion of the central guide member, it is noted that such surface or wall is formed of two main segments which are both angularly disposed downwardly with respect to the Z-Bar. In this manner, the outermost portion 37' of such wall will not interfere with the cylindrically shaped material overlaying said wall when the Z-Bar is in use as will hereinafter be discussed in greater detail.

The web portion of the Z-Bar is vertically tapered or diminished along its length being a greater vertical dimension or thicker adjacent the feed end of the Z-Bar and converging and terminating toward but remote from the discharge end thereof. In this regard, FIG. 3 is a cross-sectional view of the Z-Bar showing the web portion adjacent the feed end of the Z-Bar wherein substantially the maximum thickness of the web or interface is illustrated. In contrast, FIG. 4 is a cross-sectional view of the Z-Bar which shows that no web portion remains along the length of the Z-Bar adjacent the discharge end 20 thereof. With particular reference to FIG. 5, it is shown that the interface 29 tapers to a terminal edge 29' remote from the discharge end 20 of the Z-Bar. From this point, the upper and lower guide portions 27 and 28 of the central guide member are not inter-connected by a web but are suspended or cantilevered outwardly in spaced relationship to the discharge end 20 of the Z-Bar, such cantilevered portions are designated as 27' and 28'. The taper given to the web portion is relatively constant from the feed end of the Z-Bar to the termination point 29' and thereby causes the edges of the sheet material to be substantially in intimate abutting edge-to-edge engagement with each other as the material passes toward the discharge end of the Z-Bar and beneath the welder 17. This permits a satisfactory butt welded seam to be achieved.

The upper guide rail or bar 25 is mounted on the central guide member 24 above and in spaced relationship with the lower offset portion 28 and includes an upper wall 40, outer wall 41, inner wall 42, and lower wall having first and second wall segments 43 and 44. The wall segment 43 is inclined downwardly and inwardly from the outer wall 41 to the point of intersection with the wall segment 44. Wall segment 44 is disposed generally parallel to the innermost surface 38 of the upper wall 37 of the lower portion of the central guide member and extends generally horizontally from the inner wall 42 of the upper guide bar 25 to the point of intersection with the inclined segment 43 of the lower wall.

The area defined by the wall segment 44 of the upper guide bar 25, the surface 38 of the upper wall of the lower portion of the central guide member and a portion of the inner wall 32 of the central guide member constitute a first or upper channel 46 in which one edge of the sheet material being formed or shaped is guided.

The upper guide bar 25 is mounted so that the inner wall 42 thereof is flush against the inner wall 32 of the upper portion of the central guide member and the upper walls 30 and 40 of the upper portion of the central guide member and upper guide bar, respectively, are substantially coplanar. In this manner, the tapered lower wall segment 43 of the upper guide bar 25 and the upper sloped or tapered surface 37 of the lower portion of the central guide member define an elongated outwardly flared opening which permits the sheet material to slide along the upper channel 46.

A second or lower channel 47 which is similar to the channel 46 is formed between the lower guide bar 26 and the upper portion 27 of the central guide member 24. In this regard, the lower guide bar 26 is vertically spaced and offset from the upper guide bar 25 and is located on the opposite side of the vertical plane which defines the web portion 29 of the central guide member. In this manner, the junction between the upper guide bar and the central guide member and the lower guide bar and the central guide bar are generally in vertical alignment.

The lower guide bar 26 includes a lower wall 48, outer wall 49, inner wall 50 and an upper wall having a two step inclined portion 51 and 51' similar to that of the upper wall 37 of the lower portion 28 of the central guide member and a horizontal portion 52. The horizontal portion 52 of the upper wall of the lower guide bar is spaced from the innermost planar surface 39 of the lower wall 33 of the upper portion of the central guide member and extends generally parallel thereto. The area between the wall portion 52, the surface 39 and a portion of the inner wall 36 of the lower portion 28 of the central member defines the lower channel 47.

The upper and lower guide bars 25 and 26 are removably mounted on the upper and lower portions 27 and 28, respectively, of the central guide member by a combination of dowels 55 and cap screws 56. The dowels 55 are press fitted through aligned openings 57 which extend through the guide bars and central guide member, respectively, adjacent to the feed end of the Z-Bar. The cap screws 56 are spaced along the length of the Z-Bar and are received in threaded openings 58 in the upper and lower guide bars. Bores 59 extend through the upper and lower portions of the central guide member in alignment with each opening 57 and each of the bores 58 includes a counterbore 59' in which the heads of the screws 56 are received.

In the present instance, the material used to make cans ordinarily has a thickness in the range of 0.005 inch (0.127 mm) to 0.02 inch (0.30 mm) and preferably may be a 75# tinplate which has a thickness of approximately 0.008 inch (0.203 mm). With particular reference to FIGS. 3–5, the channels 46 and 47 are progressively reduced in width along the length of the Z-Bar and when material having a thickness of 0.008 inch (0.203 mm) is used, the channels will begin tapering from approximately 0.015 inch (0.406 mm) adjacent the feed end of the Z-Bar (FIG. 3) and constantly taper as the channels approach the discharge end of the Z-Bar (FIG. 4) as the slope of each of the channels is relatively constant along the length of the Z-Bar. In this respect, at the terminal point of the web 29', the channels will be slightly vertically offset with respect to one another so that the effective starting height of the open channel 60 which extends from the web termination point 29' to the discharge end of the Z-Bar is approximately twice the resultant height at the discharge end thereof. Thus, the thickness or height of the combined channel 60 at the discharge end of the Z-Bar is only slightly greater than 0.008 inch (0.203 mm) when material having a thickness of 0.008 inch (0.203 mm) is being welded. The height of the combined channel 60 should only be sufficient to permit the material to be guided without binding in the channel. If material of another thickness is to be used, the upper and lower guide bars are spaced accordingly relative to the central guide bar member to adjust the height of the channels and the height of channel 60 is likewise adjusted. The Z-Bar of the invention illustrated in FIGS. 1-6 inherently permits such an adjustment in that the upper and lower guide bars 25 and 26 can be pivoted about their respective dowels 55 adjacent the inlet end of the Z-Bar when the cap screws 56 are loosened because, as showin in FIG. 4, the bores 59 and counter bores 59' are formed relatively large in comparison to the cap screws 56.

With continued reference to FIG. 2, the channel 46 is shown as also having a flared feed end portion 61 and it is noted that channel 47 has a similar portion on the opposite side of the Z-Bar. Such flared portions function to initially receive the edges of sheet material which are passing along the grooves 15 of the frame portion 14 and are introduced into the channels 46 and 47 of the Z-Bar. The flared end is created by initially tapering the opposed inclined surfaces of the guide bars and central mounting member.

As previously described, the channels 46 and 47 are reduced in dimension from the feed end toward the web termination point in order to more positively control the relative positioning of the edges of the sheet material as such edges are moved along the length of the Z-Bar. Further and with particular reference to FIGS. 3 and 4, the web has little or no horizontal width. The upper and lower portions of the central guide member are offset on either side of a vertical plane so that the innermost portion of channel 46 is vertically aligned with the innermost portion of channel 47 for their entire length.

With the present invention, the tapered web or interface 29 causes the edges of sheet material passing past the termination point of the web and subsequently from the discharge end of the Z-Bar to progressively abut one another. The cantilevered portions of the upper and lower portions 27' and 28' of the central guide member and the adjacent ends of the upper and lower guide bars 25 and 26 will insure that the opposed edges of the sheet material will continue to progress or be moved into a substantially intimate and continuous edge-to-edge abutting relationship as the material is guided along the combined channel 60 and outwardly of the discharge end of the Z-Bar. As previously discussed, the discharge end of the Z-Bar is closely spaced relative to the point of the weld W (FIG. 1) being generally as close as 0.125 inch (3.175 mm). As the discharge end of the Z-Bar is extremely close to the welding zone, it may be necessary to incline or taper the nose portion 62. Further, due to the amount of reflective heat to which the discharge end of the Z-Bar may be subjected, especially when a laser welder is being used, said discharge end of the Z-Bar may be coated with polished copper or some other high reflective material.

Since the tapered web is the structural interface which separates channels 46 and 47, the channels are seen to converge vertically relative to one another as the interface or web is reduced in vertical dimension. However, the width characteristics of each channel should be maintained as the channels converge relative to each other so as to insure that the edges of the sheet material passing therethrough will continue to be urged into a substantially aligned vertical relationship.

As shown in FIGS. 3-5, channel 46 is tapered downwardly along the length of the Z-Bar and thereby converges toward channel 47 as the web is decreased in dimension. This is achieved by tapering the lower wall 43 along the length of the upper guide bar 25. The amount of taper will depend upon the length of the Z-Bar and the final vertical dimension which is necessary to permit the thickness of material to slide along the combined channel 60.

In a similar manner the upper surface 37 of the lower portion 28 of the central guide member 24 is tapered downwardly along the longitudinal axis from the feed end to the discharge end of the Z-Bar. Again reference is made to the cross-section as shown in FIGS. 3 and 4 adjacent the feed end and discharge end of the Z-Bar, respectively. However, in this case the cross-section of the lower portion 28 of the central guide member is continually reduced from FIG. 3 to FIG. 4 as the upper guide bar 25 increases in cross-section. Further, the angle or degree of slope from one end of the wall 37 to the other should be substantially complementary to that of the corresponding slope of the vertically disposed lower wall 43 of the upper guide bar 25.

Thus as the interface decreases in dimension from the feed end of the Z-Bar toward the discharge end thereof, the lower wall 43 of the upper guide bar 25 and the upper surface 37 of the lower portion of the central guide member will taper downwardly relative to the Z-Bar and thereby channel 46 declines from the feed end of the Z-Bar to the discharge end thereof. In effect, channel 46 converges toward channel 47 along the length of the Z-Bar.

However, instead of causing the channel 46 to converge toward channel 47, along the length of the Z-Bar, channel 46 could be maintained substantially constant while the opposing walls 33 of the upper portion 27 of the central guide member and the wall portion 51 of the lower guide bar 26 may be inclined so as to cause channel 47 to converge toward channel 46. In addition, it is contemplated that both channels could be caused to converge toward one another. Also, it is contemplated that the Z-Bar could have a central guide member 24 and upper and lower guide bars 25 and 26 of substantially constant cross-sectional configuration to form generally parallel, vertically spaced channels so that such Z-Bar could function as the feed bar 14.

In the present invention, the guide rollers 16 urge the edges of the sheet material into intimate sliding engagement with the bottoms of the grooves 46 and 47 so that such edges are in spaced vertical relationship with each other.

In an alternative embodiment of the present invention, the upper portions 27 of the central guide member and the upper guide bar 25 have cantilevered nose portions 65 which extend outwardly beyond the discharge end of the Z-Bar and beyond the welding point W, FIG. 7. In this embodiment, a notch 66 may be provided in the upper walls adjacent the discharge end of the upper portion 27 of the central guide member and the upper guide bar 25. The notch permits the Z-Bar to be aligned in close proximity to the welding head WH of a conventional laser.

With further reference to FIG. 7, a conical opening 68 is provided through the nose portions 65 of the upper portion of the central guide member and the upper guide bar. The opening 68 is aligned with the welding head WH so as to permit an energy beam B to be focused on the abutted edges of the sheet material passing therebelow. Due to the amount of reflected energy, the nose portions may be specially treated or coated with a protective material. In use, the nose portions 65 not only provide a vertical barrier which will further restrain the edges of the sheet material from relative vertical displacement, but because the nose portions extend beyond the point of the weld, such nose portions will be in continous contact with the material being welded and thereby provide a good source of electrical ground which is necessary if various combinations of high energy welding techniques are contemplated.

Due to the replaceable characteristics of the three-part configuration of the Z-Bar, the parts may be made of different material depending upon the need for machinability and wear. For example, the central guide member may be made of a carbide material such as silicon carbide or may be made of other hard materials such as tool steel or the like, while the side guide bars may be made of the same material or may be made of a different wear-resistant material. Additionally, frictional engagement between the edges of the sheet material and the Z-Bar tends to erode the material of the Z-Bar and enlarge the channels, particularly when the sheet material is being moved at a speed of approximately 50 to 246 feet (15 to 75 meters) per minute, with higher speeds being contemplated. Further, in order to reduce the frictional wear, it has been necessary to use a harder steel alloy which inherently leads to less malleability and greater brittleness in the material which in turn increases the difficulty in machining the channels.

In the present invention, the central guide member 24 and the upper and lower guide bars 25 and 26 are formed separately and may be finished by surface grinding or other techniques or may be formed by precision casting to insure that the bottom corners of the channels are sharp and do not include fillets or chamfers.

Also, it is contemplated that the several elements of the Z-Bar 10 may be constructed of a less expensive, more malleable material after which each element or a portion of each element may be coated with a wear-resistant material having a low coefficient of friction such as Armaloy, chromium or the like. Such coating may be applied in a conventional manner such as by an electrodeposition process, chemical coating, electrostatic coating or the like. Normally, Z-Bars having grooves in the range of sizes contemplated herein cannot be successfully coated with a hard wear-resistant material by conventional processes since the grooves have a tendency to either collect the coating material therein with inherent clogging of the grooves or such grooves may resist penetration by the coating material. However, with the multi-element Z-Bar of the present invention, such elements are coated and finished separately and are then assembled and adjusted.

Since the central guide member and the upper and lower guide bars are formed separately, they may be removed and replaced independently without the necessity of replacing the entire Z-Bar. Also it is apparent that the portion of the Z-Bar which receives the greatest wear may be formed of or coated with the hardest material while the portions which receive less wear may be made of a softer material which can be finished more easily. Since the parts are independently replaceable, it is apparent that a smaller stock may be maintained on hand and that a smaller capital investment is involved.

As previously mentioned, the Z-Bar structure could be slightly modified to enable its use as an intermediate Z-Bar 70 such as shown in FIGS. 8-10. When welding long sheets of material, it may be preferred to use one or more such intermediate Z-Bars 70 instead of one continuous Z-Bar 10, particularly due to the practical manufacturing and cost considerations.

Such intermediate Z-Bars 70 could be provided in linear spaced relationship between the initial forming bar or rollers and the flared feed end of the welding Z-Bar 10.

With continued reference to FIGS. 8-10, the intermediate Z-Bar 70 includes a central elongated guide member 71 having upper and lower vertically spaced offset portions 72 and 73 which are integrally connected along a common vertical interface or plane 74. Upper and lower guide bars 75 and 76 are removably mounted or attached to the upper and lower portions 72 and 73 of the central guide member 71 using a plurality of spaced cap screws 77. The cap screws 77 are disposed through openings 78 in the central guide member and are received in threaded openings 79 in the upper and lower guide bars 75 and 76.

As shown in the cross-sections of FIGS. 9 and 10, a pair of vertically spaced channels, 80 and 81 are defined between the guide bars 75 and 76 and the upper and lower portions 72 and 73 of the central guide member 71. Unlike the channels of the primary Z-Bar structure 10, however, the channels do not converge vertically with respect to one another along the length of the Z-Bar 70. FIG. 9 shows the Z-Bar 70 in cross-section adjacent the feed end 85 thereof while FIG. 10 shows the cross-section of the Z-Bar 70 adjacent the discharge end 86 thereof. It should be noted that the cross-sectional dimensions of the guide bars 75 and 76 and the central guide 71 are constant and that the interface 74 is likewise of a constant vertical dimension.

Both channels 80 and 81 provide a clearance slightly greater than the feed end of the channels 46 and 47 of the primary Z-Bar. Further, both channels are slightly flared as at 88 adjacent the feed end 85 of the Z-Bar 70 so as to assist in initially guiding the edges of the sheet material into the channels.

The relative shape of the walls defining the channels 80 and 81 are similar to the channels 46 and 47 of the primary Z-Bar 10 with the exception that there is generally no longitudinal slope to any wall portion as no tapering of the channels is contemplated.

In use, the intermediate Z-Bars 70 are mounted to the frame of the forming machine between the forming rollers and the primary Z-Bar 10. As the sheet material is conveyed from the initial forming rollers, the opposing edges thereof will enter the channels 80 and 81 of the intermediate Z-Bar as opposed to entering the channels 15 of the feed bar 14 of the forming machine. Thereafter, the sheet material is guided toward the primary Z-Bar 10. As the sheet material is conveyed along the intermediate Z-Bar, the edges thereof are restrictively guided and maintained in vertically spaced relationship so that they enter the channels 46 and 47 of the primary Z-Bar.

As previously noted, the channels of the intermediate Z-Bars 70 provide more clearance than the channels of the primary Z-Bar. Thus, if the sheet material being welded is 0.008 inch (0.203 mm) in thickness, the channels 80 and 81 should provide a clearance in excess of approximately 0.015 inch (0.406 mm).

Industrial Application

The Z-Bar of the present invention may be used in the butt welding of sheet material as exemplified by the seam welding of cans or other cylindrical bodies. The Z-Bar is mounted on the main frame of a welding machine and sheets of material having a desired thickness, for example, a thickness of approximately 0.008 inch (0.203 mm), are advanced toward the feed end of the Z-Bar. As the sheet material advances, the forming rollers urge the sheet material into a cylindrical configuration. As the advancing apparatus moves the sheet material forwardly, the opposed edges are received within the flared openings of the vertically spaced channels 46 and 47. As the sheet material continues to be advanced, the edges of the sheet material converge vertically toward each other so as to be in substantially intimate engagement as they initially abut one another adjacent the termination point 29' of the interface and will continue to be moved into substantially continuous edge-to-edge engagement with one another as they are advanced in the combined open channel 60 so that they are discharged from the Z-Bar and are advanced to a welder in such abutting relationship.

As it is possible for a plurality of containers to be continuously advanced along the Z-Bar to the welding station in rapid succession, the butt welding operation may be substantially continuous as mentioned earlier in the specification. Although the Z-Bar of the present invention could be used with a low energy source, it is contemplated that using a laser welder rated at approximately 1–3 KW that welding speeds of approximately 15 meters/min. (50 ft./min.) to 40 meters/min. (131 ft./min.) can be achieved using 0.008 inch (0.203 mm) tinplate material. Further, using the appropriate electrical grounding technique, a 1 KW laser welder could be used in conjunction with a 2 KW plasma arc unit positioned above the weld area to achieve welding speeds of 40 meters/min. (131 ft./min.) to 60 meters/min. (197 ft./min.). Additionally, placing the plasma arc heating unit below the weld point with the laser unit above could potentially increase welding speeds to approximately 60–80 meters/min. (197 to 262 ft./min.) when welding the same 0.008 inch (0.203 mm) thick tinplate.

I claim:

1. A Z-Bar apparatus for guiding the edges of sheet material into intimate abutting edge-to-edge relationship with each other as the material is being moved to a welding zone adjacent thereto, comprising a Z-Bar having inlet and discharge ends, an elongated central guide member and elongated upper and lower guide bar means, said upper and lower guide bar means having first and second ends, said central guide member including upper and lower vertically offset portions connected by a generally vertically disposed interface, said offset portions having generally vertically aligned walls on opposite sides of said interface, means for mounting said upper and lower guide bar means on said walls of said upper and lower portions of said central guide member, respectively, said second ends of said upper and lower portions of said central guide member and said second ends of each of said upper and lower guide bars extending toward a welding apparatus, a first channel formed between said lower portion of said central guide member and said upper guide bar means, a second channel formed between said upper portion of said central guide member and said lower guide bar means, said first and second channels being in vertically spaced relationship with one another along at least a portion of the length of said central guide member and being of a size to slidably receive and guide the edges of the sheet material, at least one of said channels tapering relative to the other along its length so that said channels progressively converge vertically relative toward one another along said central guide member, said vertical interface between said upper and lower portions of said central guide member being continuously reduced in dimension along its length and terminating at a point spaced from said discharge end of said Z-Bar, said first and second channels converging into open communication along the length of said Z-Bar between said point at which said interface terminates and said discharge end of said Z-Bar so that the edges of the sheet material are brought into abutting edge-to-edge engagement within said Z-Bar, whereby the edges of the sheet material are in substantially abutting edge-to-edge engagement with one another as the sheet material is discharged from the Z-Bar apparatus into the welding zone.

2. The invention of claim 1 in which each of said upper guide bar means and said upper portion of said central guide member includes a portion which extends longitudinally beyond said second end of said lower portion of said central guide member so as to extend beyond said welding zone for retaining the Z-Bar in substantial contact with the sheet material beyond the welding zone.

3. The invention of claim 2 in which an opening is provided through said extended portions which opening is in alignment with the welding zone, whereby energy from the welding apparatus may pass therethrough.

4. The invention of claim 1 in which at least one of said upper or lower guide bar means is tapered along its length.

5. The invention of claim 1 in which said upper and lower portions of said central guide member are cantilevered outwardly in spaced relationship with one another between said point at which said interface terminates and said second ends thereof.

6. The invention of claim 1 in which said first and second channels are approximately 0.008 to 0.010 inch in clearance height when in open communication adjacent said discharge end of said Z-Bar.

7. The invention of claim 1 in which said channels are in continuously non-overlapping relationship with each other along substantially the entire length of the Z-Bar.

8. A Z-Bar apparatus for guiding the edges of sheet material into substantially intimate engagement with each other as the material is moved to a welding apparatus, comprising, an elongated central guide member having upper and lower vertically offset portions which are integrally connected along at least a portion of their length and having inlet and discharge ends, said integrally connected portions being constantly reduced in dimension from said inlet end of said guide member toward said discharge end thereof, a pair of elongated upper and lower guide bar means, means for removably mounting said upper and lower guide bar means on said central guide member, a first channel defined between said upper guide bar means and said lower portion of said central guide member, a second channel defined between said lower guide bar means and said upper portion of said central guide member, said first and second channels being of a size to slidably receive the edges of the sheet material, said channels being in vertically spaced opposing relationship with each other and converging relative to one another along the length of said Z-Bar, and the inner edges of each of said channels having substantially sharp corners.

9. A Z-Bar apparatus for guiding the edges of sheet material as the material is moved toward welding apparatus, comprising, an elongated central guide member having upper and lower vertically offset portions which are integrally connected along at least a portion of their length and having inlet and discharge ends, said integrally connected portions extending from said inlet end of said guide member toward said discharge end thereof, elongated upper and lower guide bar means, means for removably mounting said upper and lower guide bar means on said central guide member in vertically offset relationship with respect to one another on opposite sides of said central guide member, said upper guide bar means being mounted on said upper portion of said central guide member and said lower guide bar means being mounted on said lower portion of said central guide member, a first channel defined between said upper guide bar means and said lower portion of said central guide member, a second channel defined between said lower guide bar means and said upper portion of said central guide member, said channels being of a size to slidably receive the edges of the sheet material in opposing relationship, said channels being in vertically spaced relationship with each other along at least a portion of the length of said Z-Bar, and the inner edges of each of said channels having substantially sharp corners.

10. The method of continuously butt welding the opposed edges of sheet material with a welding apparatus, comprising the steps of, urging said edges into substantially aligned vertically spaced relationship with each other, continuously advancing the sheet material towards the welding apparatus while simultaneously causing said edges to converge vertically toward each other until said edges are in generally abutting edge-to-edge relationship with one another, thereafter welding said abutted edges with the welding apparatus to butt weld the edges together.

11. The method for continuously butt welding the opposed edges of a plurality of discrete sheets of material to form cylindrical objects comprising the steps of:
  A. Continuously and sequentially forming the discrete sheets of material into generally cylindrical configurations and introducing the opposed edges thereof into vertically spaced relationship to one another in guide channels of a guide apparatus;
  B. Urging said opposed edges of each sheet of material into said guide channels as said sheets of material are continuously and sequentially advanced within said guide channels;
  C. Causing the opposed edges of each of said sheets of material to vertically converge into substantially edge-to-edge aligned relationship as the sheets of material are sequentially advanced from said guide channels within said apparatus;
  D. Thereafter continuously and sequentially introducing and butt welding the abutted edges of the sheets of material in a high energy welding zone.

12. The method of claim 11 including the step of maintaining the edges of said sheets of material in contact with said guide apparatus beyond the welding zone.

13. The method of claim 11 in which said sheets of material are continuously advanced at velocities of up to 40 meters per minute to and through the welding zone.

14. The method of claim 11 in which said sheets of material are continuously advanced at velocities of between approximately 15 to 80 meters per minute to and through the welding zone.

15. A Z-Bar structure formed of an assemblage of several parts which can be made very accurately yet inexpensively to form guide channels for guiding the edges of sheet material as the material is moved toward a welding apparatus, comprising an elongated central guide member having upper and lower vertically offset portions which are integrally connected along at least a portion of their length and having inlet and discharge ends, said integrally connected portions extending in a direction from the area of the inlet end of said guide member toward the discharge end, elongated upper and lower guide bar means, means for removably mounting said upper and lower guide bar means on said central guide member in vertically offset relationship with respect to one another on opposite sides of said central guide member, said upper guide bar means being mounted on said upper portion of said central guide member and said lower guide bar means being mounted on said lower portion of said central guide member in such a manner that a first guide channel is defined between said upper guide bar means and said lower portion of said central guide member and a second guide channel is defined between said lower guide bar means and said upper portion of said central guide member, said channels being of a size to slidably receive the edges of the sheet material in opposing relationship.

16. A Z-Bar structure according to claim 15 wherein each of said channels is tapered along at least a portion of their length.

17. A Z-Bar structure according to claim 16, wherein each of said guide channels are tapered from adjacent one end to adjacent the other end thereof.

18. Z-Bar structure according to claim 15, wherein means are provided for adjustably mounting each of said guide bar means on said central guide member to vary the height of said channels.

19. A Z-Bar structure according to claim 18, wherein said means for adjustably mounting includes means for pivotably connecting each of said guide bar means on said central guide member adjacent to the inlet end thereof.

20. A Z-Bar structure according to claims 16, 18 or 19, wherein said first and second guide channels are in vertically spaced relationship with each other along at least a portion of the length of the Z-Bar structure.

21. A Z-Bar structure according to claim 20, wherein at least one of said guide channels converges toward the other so that said channels converge vertically relative to one another along at least a part of the length of said central guide member.

22. A Z-Bar structure according to claim 21, in which said first and second guide channels are in generally planar alignment and in open communication with one another adjacent the discharge end of the Z-Bar so that the opposing edges of the sheet material are constrained in abutting relationship adjacent the discharge end of the Z-Bar.

23. A Z-Bar structure according to claim 22 in which the height of each of said channels adjacent the discharge end of the Z-Bar is approximately the same dimension as the thickness of one layer of the sheet material.

24. The method of continuously butt welding the opposed edges of sheet material with a welding apparatus comprising the steps of
  A. Urging said edges into opposed spaced relationship with each other; and
  B. Continuously advancing the sheet material towards the welding apparatus while simultaneously causing said opposed edges to converge toward each other until said edges are in generally abutting edge to edge relationship, thereafter welding said abutted edges with the welding apparatus to butt weld the edges together.

25. The method for continuously butt welding the opposed edges of a plurality of sheets of material to form cylindrical objects comprising the steps of
  A. Continuously and sequentially forming the sheets of material into generally cylindrical configurations and introducing the opposed edges thereof into space relationship to one another in opposing guide channels of a guide appartus;
  B. Urging said opposed edges of each sheet of material into said guide channels as said sheets of material are continuously and sequentially advanced within said guide channels;
  C. Confining and progressively converging the opposed edges of each said sheets of material into mutual contact as the sheets of material are sequentially advanced along said guide channels and the guide apparatus; and
  D. Thereafter continuously and sequentially welding the opposed edges of the sheet material which are in mutual contact in a high energy welding zone.

* * * * *